(12) United States Patent
Kumar et al.

(10) Patent No.: US 9,053,418 B2
(45) Date of Patent: Jun. 9, 2015

(54) SYSTEM AND METHOD FOR IDENTIFYING ONE OR MORE RESUMES BASED ON A SEARCH QUERY USING WEIGHTED FORMAL CONCEPT ANALYSIS

(71) Applicant: Formcept Technologies and Solutions Pvt.Ltd., Bangalore (IN)

(72) Inventors: Anuj Kumar, Bangalore (IN); Suresh Srinivasan, Bangalore (IN)

( * ) Notice: Subject to any disclaimer, the term of this patent is extended or adjusted under 35 U.S.C. 154(b) by 366 days.

(21) Appl. No.: 13/753,547

(22) Filed: Jan. 30, 2013

(65) Prior Publication Data

US 2013/0198195 A1    Aug. 1, 2013

(30) Foreign Application Priority Data

Jan. 30, 2012    (IN) .............................. 350/CHE/2012

(51) Int. Cl.
| | | |
|---|---|---|
| *G06F 7/00* | (2006.01) | |
| *G06N 5/02* | (2006.01) | |
| *G06F 17/30* | (2006.01) | |
| *G06F 17/24* | (2006.01) | |
| *G06F 17/27* | (2006.01) | |
| *G06N 5/00* | (2006.01) | |

(52) U.S. Cl.
CPC .. *G06N 5/02* (2013.01); *G06N 5/00* (2013.01); *G06F 17/30424* (2013.01); *G06F 17/245* (2013.01); *G06F 17/2765* (2013.01)

(58) Field of Classification Search
CPC ............ G06F 17/2765; G06F 17/2755; G06F 17/2785; G06K 9/00469
USPC ......... 705/7.14, 321; 707/740, 748, 755, 780; 382/155
See application file for complete search history.

(56) References Cited

U.S. PATENT DOCUMENTS

| | | | | |
|---|---|---|---|---|
| 8,650,177 | B2 * | 2/2014 | Skomoroch et al. | 707/710 |
| 2003/0177052 | A1 * | 9/2003 | Smith et al. | 705/9 |
| 2006/0245641 | A1 * | 11/2006 | Viola et al. | 382/155 |
| 2009/0112892 | A1 * | 4/2009 | Cardie et al. | 707/100 |
| 2010/0070492 | A1 * | 3/2010 | Dattatri et al. | 707/722 |
| 2011/0078154 | A1 * | 3/2011 | Rickman et al. | 707/748 |

* cited by examiner

*Primary Examiner* — Cheyne D Ly
(74) *Attorney, Agent, or Firm* — The Law Office of Austin Bonderer, PC

(57) ABSTRACT

A system for identifying one or more resumes from a set of resumes matches a search query using a resume identifying tool is provided. The system includes a memory unit that stores a database and a set of modules, a display unit, and a processor. The set of modules includes (a) a keyword extraction module extracts at least one keyword from the search query, (b) a disambiguation module disambiguates the at least one keyword based on weighted formal concept analysis, and (c) and a resume identification module identifies the one or more resumes by matching (i) the at least one keyword associated with the search query, and (ii) at least one category associated with the at least one keyword with (i) at least one disambiguated keyword associated with each resume of the set of resumes, and (ii) at least one category associated with the at least one disambiguated keyword.

12 Claims, 11 Drawing Sheets

SYSTEM AND METHOD FOR IDENTIFYING ONE OR MORE RESUMES BASED ON A SEARCH QUERY USING WEIGHTED FORMAL CONCEPT ANALYSIS

CROSS-REFERENCE TO RELATED APPLICATIONS

This application claims priority to Indian patent application no. 350/CHE/2012 filed on Jan. 30, 2012, the complete disclosure of which, in its entirety, is herein incorporated by reference.

BACKGROUND

1. Technical Field

The embodiments herein generally relate to searching resumes by providing a search query as an input, and more particularly to automatically analyze the search query using weighted formal concept analysis (wFCA), and identify right candidate(s) resume(s) that corresponds to the search query.

2. Description of the Related Art

Recruitment is a process of attracting, screening and selecting a qualified person for a job. Irrespective of an organization size, all organisations need the right candidates who suit for their needs. The process of the recruitment is not at all an easy task. It has been always a challenge for any organization, since the numbers of candidate resumes coming in are huge for a specific job description.

At present, recruiter has to manually check these candidates resume for their relevancy with respect to the job description. Thus, for preliminary screening of candidates, one has to manually check the resumes. Usually, this process is time consuming and also increases labor costs.

Further, there are many existing job portals that provide recruiters a way for searching candidates in their database. The recruiters can search for the candidates using keywords associated with a job. However, the possibilities of missing a right candidate associated with such keywords are vast. Because, one may search the candidates with general keywords such that results retrieved may not be relevant. Further, when the recruiter uses very specific keyword to retrieve the candidates, there is a chance of missing the right candidate. Moreover, the recruiter has to understand a job requirement from the job description, identify one or more right keywords from the job description, and manually construct a query to find the resumes. Accordingly there remains a need for a resume identifying tool that automatically analyses a search query, and identifies one or more resumes that correspond to the search query.

SUMMARY OF THE INVENTION

In view of a foregoing, an embodiment herein provides a system for identifying at least one resume from one or more resumes based on a search query using a resume identifying tool. The system includes (i) a memory unit that stores a database and a set of modules, (ii) a display unit, and (iii) a processor that executes the set of modules. The database stores (i) at least one disambiguated keyword associated with each resume of the one or more resumes, and (ii) at least one category associated with the at least one disambiguated keyword associated with each resume of the one or more resumes. The set of modules include (a) a keyword extraction module, executed by the processor that extracts at least one keyword associated with the search query, and (b) a disambiguation module executed by the processor that disambiguates the at least one keyword associated with the search query based on a weighted Formal Concept Analysis (wFCA). The disambiguation module generates a lattice that includes at least one concept generated based on (i) the at least one keyword of the search query, and (ii) at least one category associated with the at least one keyword of the search query. The set of modules further includes a resume identification module executed by the processor to identify the at least one resume from the one or resumes by matching (i) the at least one keyword associated with the search query, and (ii) the at least one category associated with the at least one keyword of the search query with (i) the at least one disambiguated keyword associated with each resume of the one or more resumes, and (ii) the at least one category associated with the at least one disambiguated keyword associated with each resume of one or more resumes. The at least one concept associated with the search query may be generated with the at least one keyword as object, and at least category associated with the at least one keyword as attribute. The at least one category may be obtained from a knowledge base, and may be arranged based on a hierarchy.

In another embodiment, a non-transitory program storage device readable by computer, and including a program of instructions executable by the computer to perform a method of identifying at least one resume from one or more resumes based on a job description using a weighted formal Concept Analysis (wFCA) is provided. The method includes (a) storing (i) at least one disambiguated keyword associated with each resume of the one or more resumes, and (ii) at least one category associated with the at least one disambiguated keyword associated with each resume of the one or more resumes in a database, (b) extracting at least one keyword associated with the job description, (c) disambiguating the at least one keyword associated with the job description using a disambiguation module based on the weighted Formal Concept Analysis (wFCA), and (d) identifying the at least one resume from the one or more resumes by matching (i) the at least one keyword associated with the job description, and (ii) at least one category associated with the at least one keyword of the job description with (i) the at least one disambiguated keyword associated with each resume of the one or more resumes, and (ii) the at least one category associated with the at least one disambiguated, keyword associated with each resume of the one or more resumes. The disambiguation module generates a lattice that includes at least one concept generated based on (i) the at least one keyword of the job description, and (ii) at least one category associated with the at least one keyword of the job description. The at least one concept associated with the search query may be generated with the at least one keyword as object, and at least category associated with the at least one keyword as attribute. The at least one category may be obtained from a knowledge base, and may be arranged based on a hierarchy.

In yet another embodiment, a method of identifying at least one resume from one or more resumes based on a search query using a weighted Formal Concept Analysis (wFCA) is provided. The method includes (a) storing (i) at least one disambiguated keyword associated with each resume of the one or more resumes, and (ii) at least one category associated with the at least one disambiguated keyword associated with each resume of the one or more resumes in a database, (b) extracting at least one keyword associated with the search query, (c) generating a lattice that includes at least one concept generated based on (i) the at least one keyword of the search query, and (ii) at least one category associated with the at least one keyword of the search query, (d) disambiguating the at least one keyword associated with the search query based on the lattice, and (e) identifying the at least one resume from the one or more by matching (i) the at least one keyword associated with the search query, and (ii) the at least one category associated with the at least one keyword of the search query with (i) the at least one disambiguated keyword associated with each resume of the one or more resumes, and (ii) the at least one category associated with the at least one disambiguated keyword associated with each resume of the one or more resumes. The at least one concept associated with the search query is generated with the at least one keyword as object, and the at least one category associated with the at least one keyword as attribute. The at least one category may be obtained from a knowledge base, and may be arranged based on a hierarchy. The search query may include a job description.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
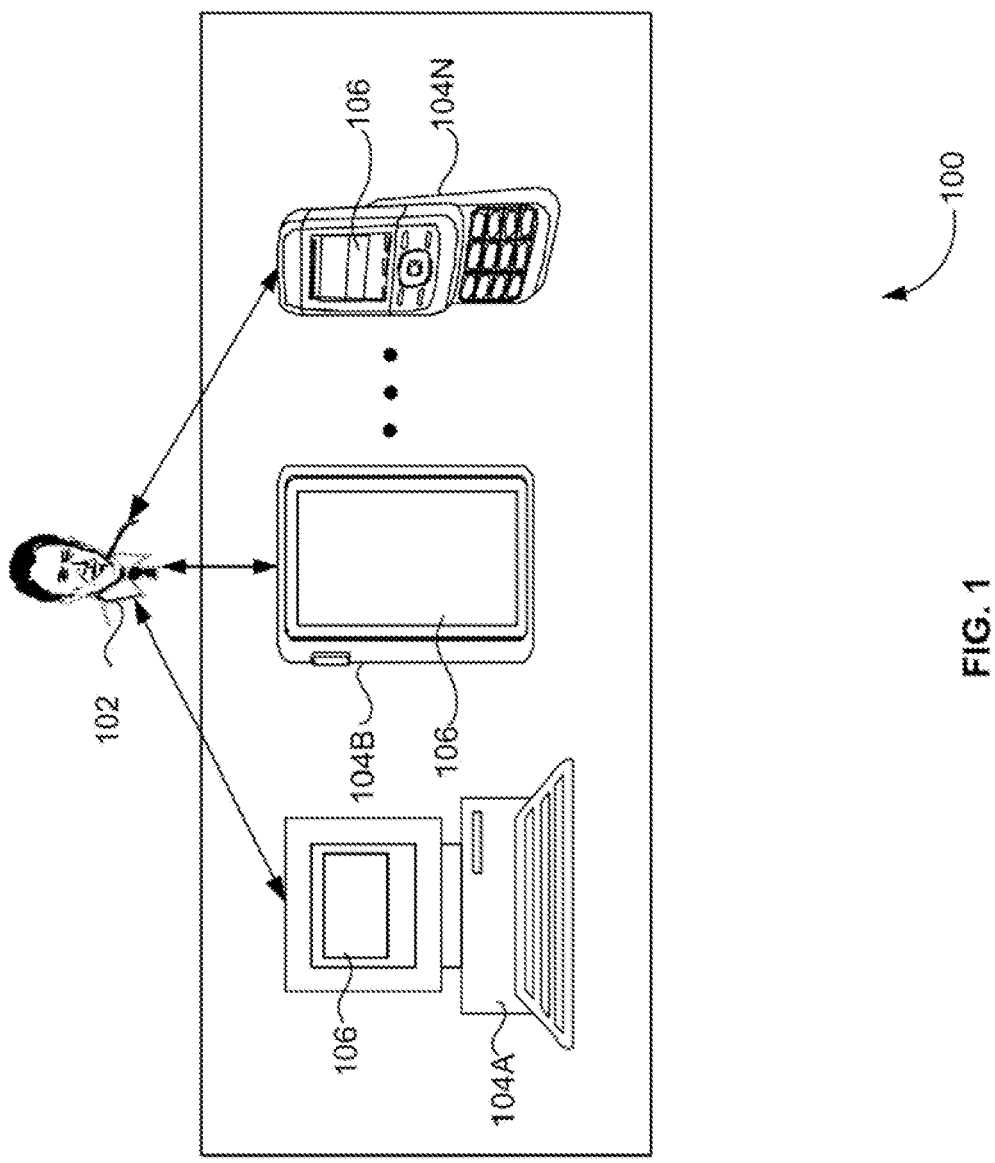
FIG. 1 illustrates a system view of a user communicating with a user system for searching one or more resumes by providing a search query as an input using a resume identifying tool according to am embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a resume identifying tool that automatically analyses a search query, and identifies one or more resumes that correspond to the search query. The resume identifying tool identifies one or more ambiguous keywords in the search query, and disambiguates the one or more ambiguous keywords using weighted formal concept analysis (wFCA). The search query with one or more disambiguated keywords are used to identify one or more resumes that correspond to the search query. In one embodiment, the resume identifying tool automatically matches one or more resumes to the search query based on project details of the one or more resumes. In another embodiment, the resume identifying tool matches one or more resumes to the search query based on an experience that is mentioned in each resume of the one or more resumes. Additionally, the resume identifying tool extracts one or more resumes from emails (e.g., mail inbox), Databases, etc and provides a dashboard to a recruiter on prospective candidates, their summary. Referring now to the drawings, and more particularly to FIGS. 1 through 11, where similar reference characters denote corresponding features consistently throughout the figures, there are shown preferred embodiments.

FIG. 1 illustrates a system view 100 of a user 102 communicating with a user system 104A-N for searching one or more resumes by providing a search query as an input using a resume identifying tool 106 according to an embodiment herein. The user system 104A-N may be a personal computer (PC) 104A, a tablet 104B and/or a smart phone 104N. The user 102 provides the search query using the resume identifying tool 106 to identify, and obtain the one or more resumes that correspond to the search query.

Figure 2:
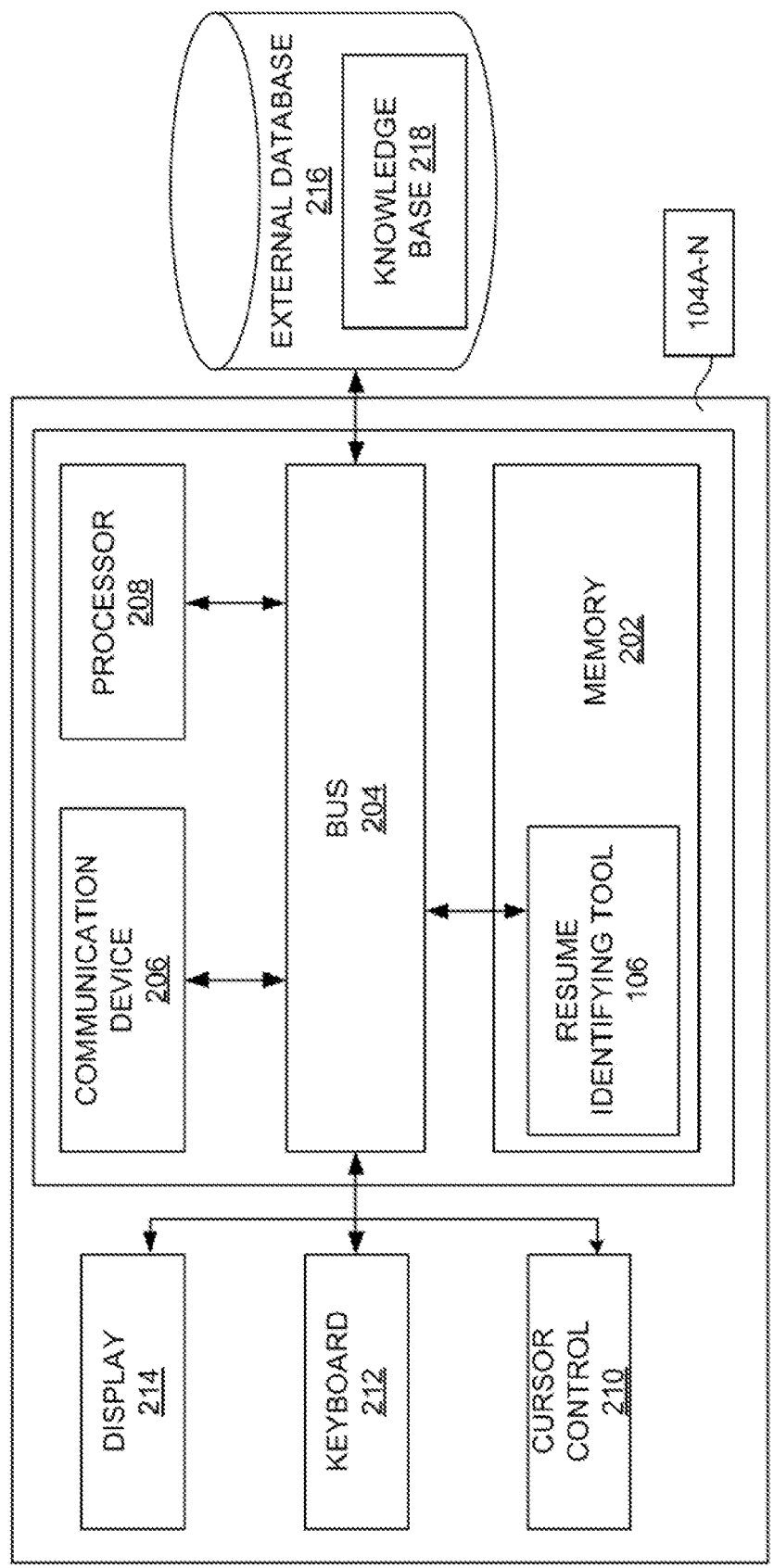
FIG. 2 illustrates an exploded view of the user system with a memory storage unit for storing the resume identifying tool of FIG. 1 and an external database according to an embodiment herein.

FIG. 2 illustrates an exploded view of the user system 104A-N with a memory storage unit 202 for storing the resume identifying tool 106 of FIG. 1 and an external database 216 according to an embodiment herein. The user system 104A-N includes a memory storage unit 202, a bus 204, a communication device 206, a processor 208, a cursor control 210, a keyboard 212 and a display 214. The memory storage unit 202 stores the resume identifying tool 106. The resume identifying tool 106 includes one or more software modules to perform various junctions on a search query and assists the user 102 in choosing one or more right candidates for the search query. The external database 216 includes a knowledge base 218 that is constructed based on the concepts of linked data. The knowledge base 218 includes a set of categories that correspond to various keywords.

Figure 3:
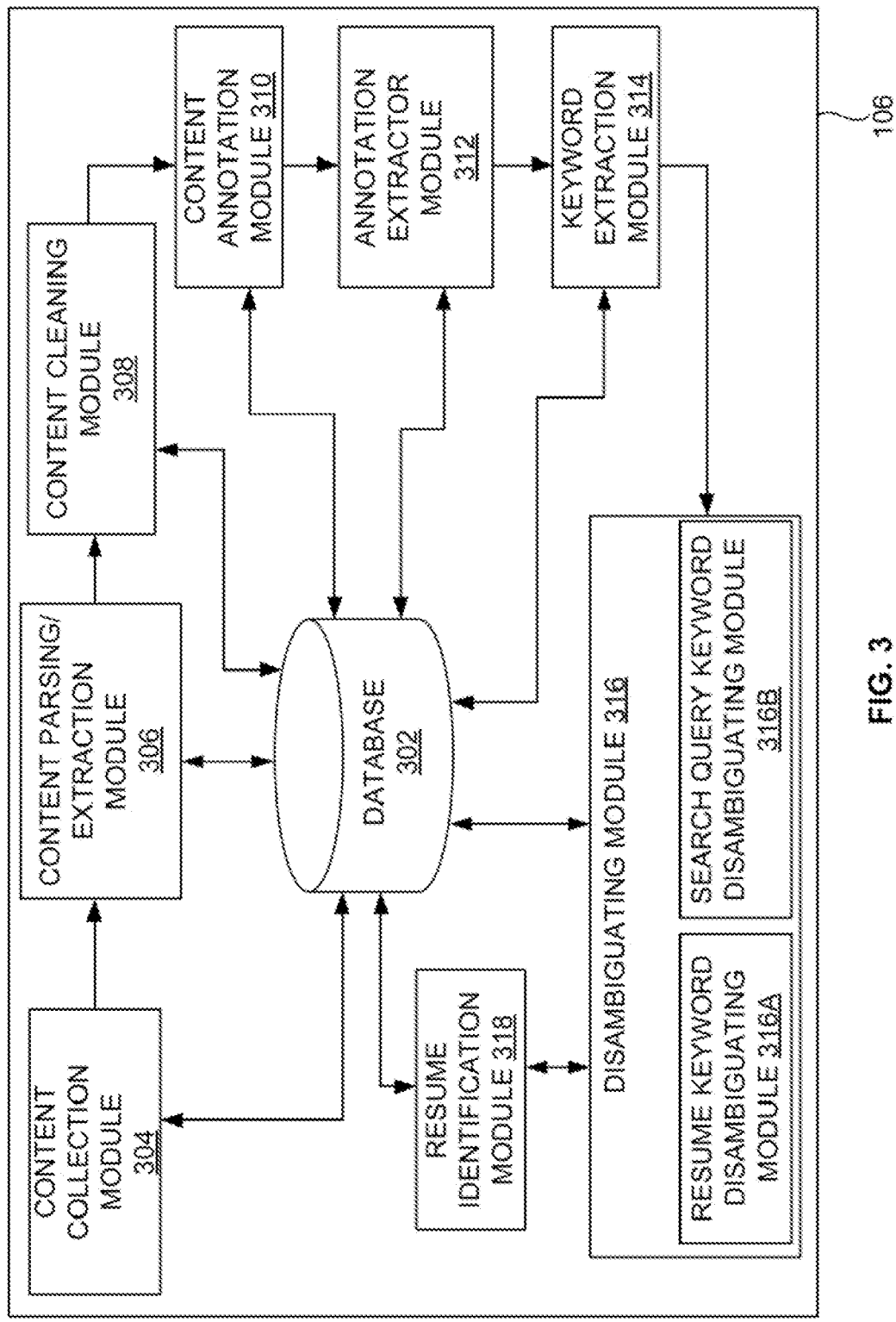
FIG. 3 illustrates an exploded view of the resume identifying tool of FIG. 1 according to an embodiment herein.

FIG. 3 illustrates an exploded view of the resume identifying tool 106 of FIG. 1 according to an embodiment herein. The exploded view of the resume identifying tool 106 includes a database 302, a content collection module 304, a content parsing/extraction module 306, a content cleaning module 308, a content annotation module 310, an annotation extractor module 312, a keyword extraction module 314, a disambiguating module 316, and a resume identification module 318. The database 302 includes a set of resumes. In one embodiment, each ambiguous keyword associated with a resume of the set of resumes is already disambiguated using weighted formal concept analysis (wFCA), and is stored in the database 302. Similarly, all ambiguous keywords associated with the set of resumes are disambiguated and stored in the database 302. Thus, the database 302 includes (i) one or more disambiguated keywords associated with each resume of the set of resumes, and (ii) one or more category associated with each disambiguated keyword of the one or more disambiguated keywords. In one embodiment, a set of categories associated with various keywords is stored in the database 302.

The content collection module 304 collects content or test associated with each resume of the set of resumes. Formats of such resumes may include, for example, abc.doc, xyz.pdf, 123.rtf, and/or URL, etc. In one embodiment, the content collection module 304 may collect content from an external storage, and attachments from emails. The content parsing/extraction module 306 extracts the content from one or more resumes (e.g. abc.doc, xyz.pdf, etc), and provide the content that are required to analyze the one or more resume. Further, the content parsing/extraction module 306 parses HTML content in case one of the sources of an input is a URL. The content cleaning module 308 cleans the content before sending it to the content annotation module 310. Cleaning may include removal of junk characters, new lines that are not useful, application specific symbols (e.g., MS Word bullets), and/or non-unicode characters etc. In one embodiment, specific parts of the document (e.g., footer) are specified as to be excluded The content annotation module 310 annotates content of a resume for useful information (e.g., keywords, sentences, tokens, new lines, sections, durations, etc). At the end of annotation, the content annotation module 310 has sentences, keywords, tokens, new lines, sections, donations, durations within the sections, sentences associated with sections, and sentences associated with duration of the resume. The annotation extractor module 312 is implemented to extract all these annotated contents. The keyword extraction module 314 extracts one or more keywords associated with a search query that is provided as an input to identify one or more relevant resumes. The one or more relevant resumes that correspond to the search query are obtained from the set of resumes stored in the database 302. In one embodiment, the search query is a job description. The disambiguating module 316 includes sub-modules such as a resume keyword disambiguating module 316a, and a search query keyword disambiguating module 316. The resume keyword disambiguating module 316 disambiguates one or more ambiguous keywords associated with a resume, and stores in the database 302 as described previously. The search query keyword disambiguating module 316b disambiguates the one or more keywords associated with the search query by generating a lattice. The lattice includes at least one concept that is generated based on (i) the one or more keywords associated with the search query, and (ii) at least one category associated with the one or more keywords. The at least one category associated with the one or more keywords is obtained from the knowledge base 218, or from the database 302.

The resume identification module 318 identifies one or more resumes that correspond to the search query from the set of resumes stored in the database 302 by matching (i) the one or more keywords associated with the search query, and (ii) the at least one category associated with the one or more keywords of the search query with (i) at least one disambiguated keyword associated with each resume of the set of resumes, and (ii) at least one category associated with the at least cue disambiguated keyword associated with each resume of the set of resumes.

Figure 4:
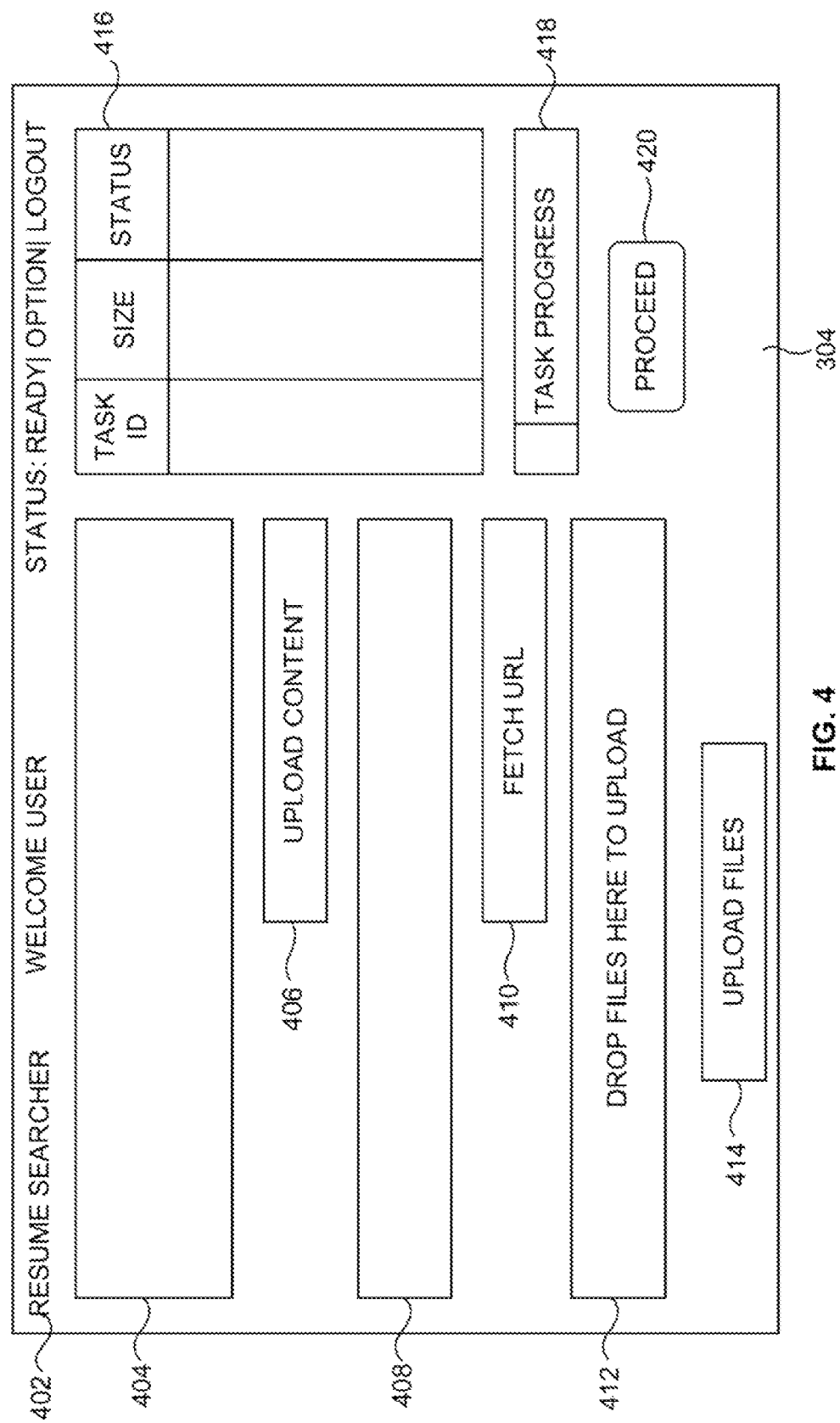
FIG. 4 illustrates a user interface view of the content collection module of FIG. 3 of the resume identifying tool of FIG. 1 according to an embodiment herein.

FIG. 4 illustrates a user interface view of the content collection module 304 of FIG. 3 of the resume identifying tool 106 of FIG. 1 according to an embodiment herein. The user interface view of the content collection module 304 includes a header 402, a text field 404, an upload button 406, an URL test field 408, a fetch, button 410, a drag and drop field 412, an upload a file button 414, a task status table 416, a task progress field 418, and a proceed button 420. The header 402 displays a logo, a welcome message the status of an application. A job seeker may upload a resume in one or more format. Through, the text field 404, the job seeker can provide details of the resume in a form of plain text, and enter on the upload button 406 to upload the plain text provided in the text field 404 to a remote server.

The plain text may also be provided as an URL in the URL text field 408, and the resume associated with the URL is crawled using the fetch button 410. The drag and drop field 412 helps the job seeker to drag and drop his/her resume to be uploaded. Through, the upload a file button 414, the job seeker browses his/her resume to be uploaded. The task status table 416 displays an uploaded resume as a plain text, the URL, and/or the resume. The task progress field 418 notifies the job seeker about a progress of analyzing the resume. The job seeker is redirected to a next page when he/she clicks on the proceed button 420.

Figure 5:
FIG. 5 illustrates a user interlace view of content from a resume provided as an input by a job seeker to the resume identifying tool of FIG. 1 according to an embodiment herein.

FIG. 5 illustrates a user interface view 500 of content 502 from a resume 504 provided as an input by a job seeker to the resume identifying tool 106 of FIG. 1 according to an embodiment herein. The content from the resume 504 may be obtained in the form of a document, a URL, and/or a plain-text. The content collection module 304 collects the content 502, and stores it on a server. In one embodiment, the content 502 is collected from one or more documents (e.g., abc.doc, and/or xyz.pdf), and are parsed/extracted (e.g., using the content parsing/extraction module 306 of FIG. 3). In another embodiment, the content 502 from the resume 504 may be fed as an URL (e.g., www.linkedin.com/xyz-resume.html).

The content collection module 304 of FIG. 3 fetches the content from the resume associated with the URL. The content cleaning module 308 cleans the content 502 before sending it for annotation. Cleaning the content 502 is required to remove junk characters, new lines that are not useful, application specific symbols (word processing bullets, etc.), and/or non-Unicode characters, etc. In one embodiment, the content from the resume 504 itself is already a cleaned text.

Figure 6:
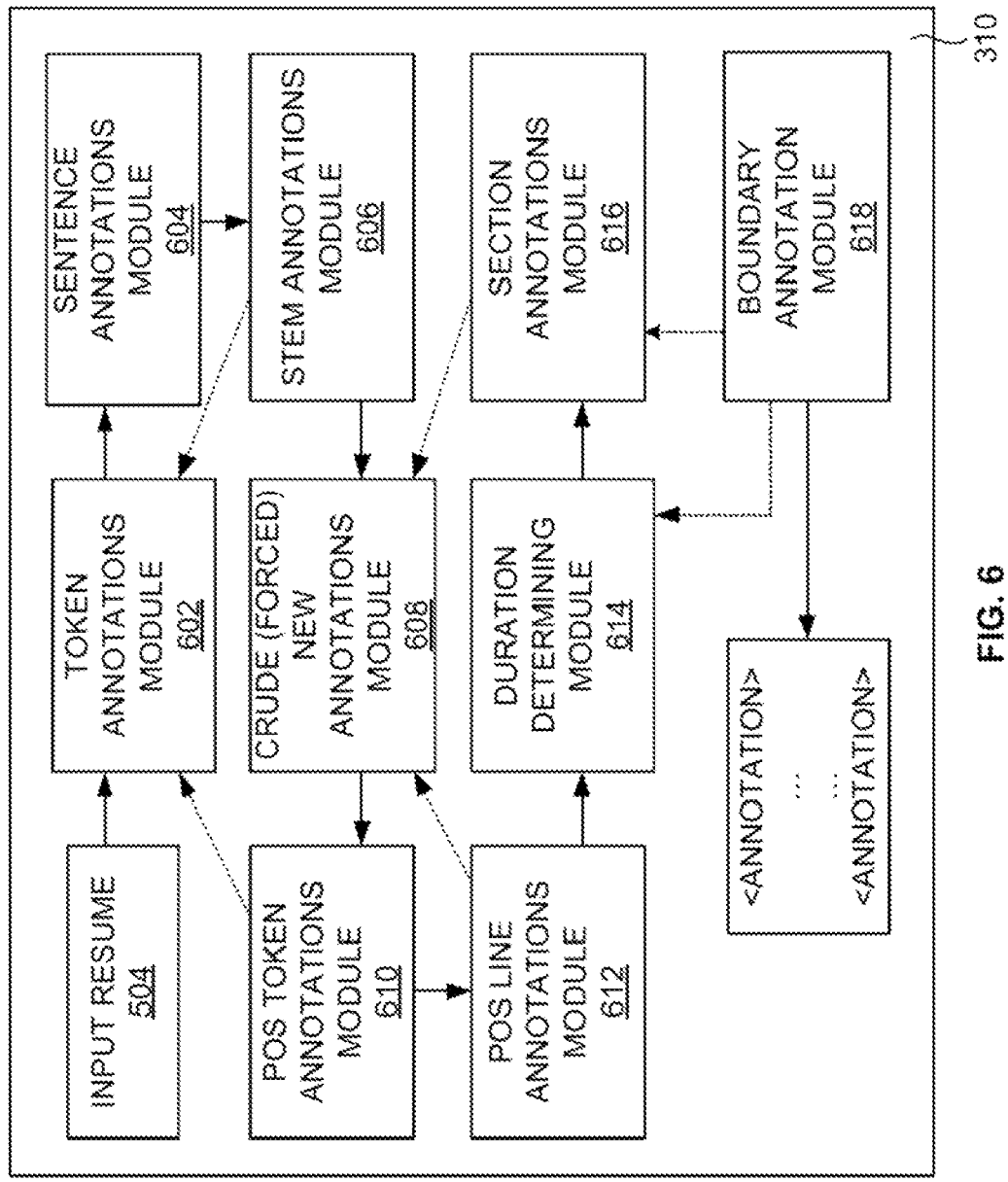
FIG. 6 illustrates an exploded view of the content annotation module of FIG. 3 of the resume identifying tool of FIG. 1 according to an embodiment herein.

FIG. 6 illustrates an exploded view of the content annotation module 310 of FIG. 3 of the resume identifying tool 100 of FIG. 1 according to an embodiment herein. The content annotation module 310 annotates the content of the resume 504 for useful information. The content annotation module 310 includes a token annotations module 602, a sentence annotations module 604, a stem annotations module 606, a forced new lines, paragraphs and indentations computing module 608, a parts of speech tag (POS) token annotations module 610, a POS line annotation module 612, a duration determining module 614, a section annotations module 616, and a boundary annotation module 618. The dotted lines of FIG. 6 represent internal dependencies among the various modules. The solid lines represent the flow of annotation process.

After parsing and cleaning of the content 502, the cleaned content is annotated by performing various levels of annotations using the modules of content annotation module 310 of FIG. 3. The sentence annotations module 604 extracts each and every sentence from the content 502. For example, the first sentence of the content 502 is extracted by the sentence annotations module 604 includes "PhD at MIT Media Lab, Massachusetts Institute of Technology."

Similarly, the sentence annotations module 604 extracts all the sentences from the resume.

The token annotations module 602 determines each and every token in the extracted sentences. For example, "PhD", "at", "MIT", "Media", "Lab", ",", "Massachusetts," "Institute", "of", "Technology" are all tokens in the first line of the content of the resume 504. The stem annotations module 606 computes the root word for each and every token identified by the token annotations module 602.

The POS token annotations module 610 generates one or more parts of speeches (POS) tag such as noun, and/or verb, etc. for each token in the sentences such that each token annotation has an associated POS tag. The forced new lines, paragraphs and indentations computing module 608 determines white spaces like new lines that are forced (e.g., pressed enter, list of items that are not proper sentence), paragraphs, and/or indentations, etc. Further, the POS line annotations module 612 tags each token in the extracted new lines as a noun, and/or a verb, etc. In addition, new lines are also useful for section extraction because section names may not be proper sentences. For example, in the content 502, "education" and "working experience" are not proper sentences but a word, and a fragment of two words respectively. These are captured as a new line (e.g., using the section annotations module 616) because they occur in a separate line.

The duration determining module 514 extracts one or more durations wherever it occurs in the content of the resume 504. For example, it extracts durations, like "2008 to current", "2006 to current", etc. The section annotations module 616 determines a group of sentences that form a section that has a heading. To determine the start and end point of the section, various heuristics such as lookup for well known sections, sentence construction based on parts of speech, relevance with respect to surrounded text, exclusion terms, term, co-occurrence, etc.

The boundary annotations module 618 associates related text with the duration identified by the duration determining module 614. Most often, there may be information that is associated with the duration but is not mentioned in the same line where duration occurs. The boundary annotations module 618 assigns a right boundary and a left boundary to identify exact information associated with the duration. For example, "PhD at MIT Media Lab, Massachusetts Institute of Technology 2008 to current; Massachusetts Institute of Technology; CPA 5.0/5.0 Master of Science at MIT Media Lab, Massachusetts Institute of Technology 2006 to current; Media Arts and Sciences; Massachusetts Institute of Technology; CPA 4.9/5.0

Master of Design at IDC, IIT Bombay 2003 to 2005; Industrial Design Centre, Indian Institute of Technology, Bombay; CPA 4.9/5.0

Bachelor of Computer Engineering at Gujarat University 1999 to 2003; Mirma Institute of Technology; Gujarat University; CPA 4.7/5.0 Working Experience"

In the example, the text shown is selected torn the education section and a new section ("working experience") of the content 502. The duration determining module 614 determines the periods such as "2008 to current", "2806 to current", "2003 to 2005" and "1993 to 2003". The section annotations module 616 determines "working experience" as a new section. The boundary annotations module 618 assigns the left boundary and the right boundary for each of the identified duration. The left boundary for the duration "2008 to current" is "PhD at MIT Media Lab, Massachusetts Institute of Technology". The right boundary is Master of Science at MIT Media Lab, Massachusetts Institute of Technology. Both these lines, left and right to the duration annotations are considered as possible associations with the duration "2008 to current". Similarly, left and right boundaries are assigned for each of the duration. The right boundary for the last duration "1999 to 2003" is a new section ("working experience"). Therefore, the boundary annotations module 618 computes that right boundary for the last duration is not associated with the context of that duration. Further, the resume identifying tool 106 understands the section and the context in which the year like numbers are occurring and include/exclude based on the context. For example, a candidate's resume states that the "person stands 1st out of 2000 people who have all attended the interview" then the resume identifying tool 106 correctly identifies that 2000 is not part of the duration.

Further, the boundary annotations module 618 uses a simple heuristics to determine the best possible association for entire section. The heuristic counts the number of left and right associations for the entire section. In the above example, the numbers of left associations are more compared to the number of right associations since the last duration annotation does not have any line covered by the right boundary. Since, the left associations are more compared to the right associations, the boundary annotations module 618 will consider left association as the best possible association. Thus the duration "2008 to current" is associated with the "PhD at MIT Media Lab, Massachusetts Institute of Technology".

Once the annotations are done, the annotation extractor module 312 extracts all the required artifacts from the annotations. The annotation extractor module 312 extracts the name, email address, phone number, and any other contact details that are mentioned in the resume 504. Additionally, the annotation, extractor module 312 extracts one or more sentences, one or more keywords, one or more sections, duration within the section, one or more spans of duration, etc. occurred within the content of the resume 504.

The keywords are extracted based on the parts of speech tag generated by the POS modules using the token annotations module 602 and the forced new lines, paragraphs and indentations computing module 608. For example, a noun is very likely to be a keyword in the sentence. Similarly co-occurring nouns and its derivatives are also a keyword. A keyword chunker is used to obtain these keyword and keyword phrases depending on the noun and related tags. The annotation extractor module 312 extracts keywords (e.g., 3 keywords) using POS tag generated by the POS token annotations module 610 and the POS line annotations module 612. The extracted keywords are:

PhD—POS Tag says that it is a noun

MIT media lab—POS Tag says that it is a noun

Massachusetts Institute—POS Tag says that it is a noun.

Once these keywords are identified and extracted, they are disambiguated to find the right meaning. To disambiguate, the resume identifying tool 106 determines the different disambiguated terms for the extracted keywords and their related categories. Further, the resume identifying tool 106 uses the knowledge base 218 stored in the external database 216 for obtaining the categories for the extracted keywords. Each keyword is queried separately against the knowledge base

218 and corresponding categories are obtained. For example, for the above keywords. For example, the categories obtained are:

PhD—{Education, Qualifications, Academic Degrees, Doctoral Degrees, Doctor of Philosophy}

MIT Media Lab—{Education, Educational Organizations, Educational Institutions, Academic Institutions, Universities and Colleges, Universities and Colleges by Country, Universities and Colleges in the United States, Universities and Colleges in Massachusetts, Massachusetts Institute of Technology}

Massachusetts Institute—{Education, Educational Organizations, Educational Institutions, Academic Institutes, Universities and Colleges, Universities and Colleges by Country, Universities and Colleges in the United States, Universities and Colleges in Massachusetts}

These keywords are either nouns or noun phrases. The resume identifying tool 106 allows certain prepositions as well to determine the keywords, for example, "in". For example, if preposition "in" is considered, the keywords extracted will include—"PhD at MIT Media Lab" and "Massachusetts Institute of Technology". These keywords are then queried against the knowledge base 218. If a match is found then they are included in the set of keywords. Here, there are no disambiguations found. All the extracted keywords are unique in the context of right meaning. If there are any ambiguities found by the resume identifying tool 106 from the resume 504, the resume identifying tool 106 disambiguates those ambiguities, and stores in the database 302.

Figure 7:
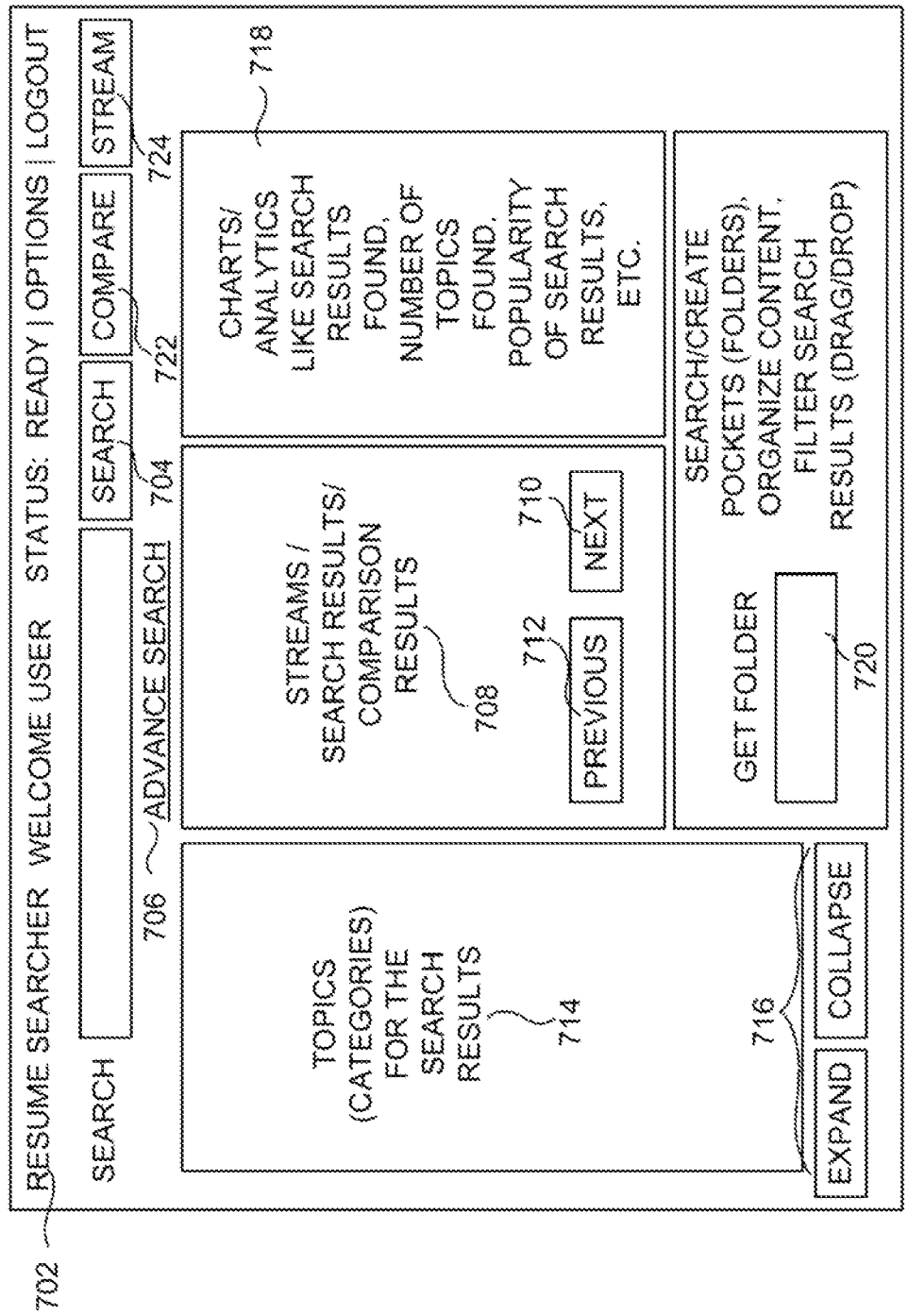
FIG. 7 illustrates a user interface view of a dashboard of the resume identifying tool of FIG. 1 according to an embodiment herein.

FIG. 7 illustrates a user interface view of a dashboard of the resume identifying tool 106 of FIG. 1 according to an embodiment herein. The user 102 communicates with the user system 104A-N to identify one or more right candidates resume for a given job description. The dashboard includes a header 702, a search button 704, an advance search button 706, a result viewing field 708, a next button 710, a previous button 712, a filter applying field 714, an expand/collapse button 716, a result analytics field 718, a content organization field 720, a compare button 722, and a stream button 724.

The user 102 search the one or more right candidates resume(s) by providing a keyword in a search text box using the search button 704. The resume identifying tool 106 understands different patients from an input search string. For example, if the user 102 specify a number with experience, it automatically searches by considering the number as an experience. Further, the user 102 may use the advance search button 700 that allows them to specify the text instead of keywords to search. This option can be used to search with description search query. In one embodiment, the search query is a job description.

The result viewing field 708 displays search results for the given job description to the user 102. The next button 710 allows the user 102 to retrieve next set of results on a next page if there are multiple pages of search results. The previous button 112 allows the user 102 to navigate to a previous page to explore the search results. The filter applying field 714 helps to categorize all the search results under one or more topic(s). In one embodiment; the one or more topic(s) are categories and keywords. This field lists the hierarchy of topics that makes it easy to filter the search results. The expand/collapse button 716 is used to expand or collapse such entire topics hierarchy.

The result analytics field 718 displays various charts and analytics to the user 102 based on the search results. For example, if the user 102 has executed a search query, this field may display the number of results matched as compared to total results, topics coverage and popularity of the search query. The same field can be used to see analytics for each selected search result. The content organization field 720 helps in managing content retrieved from the search results. Users can also search for existing pocket (folder) and filter the search results. The compare button 722 is used to compare one or more resumes. The stream button 724 is used to automatically stream/fetch new results for the last search query.

Figure 8:
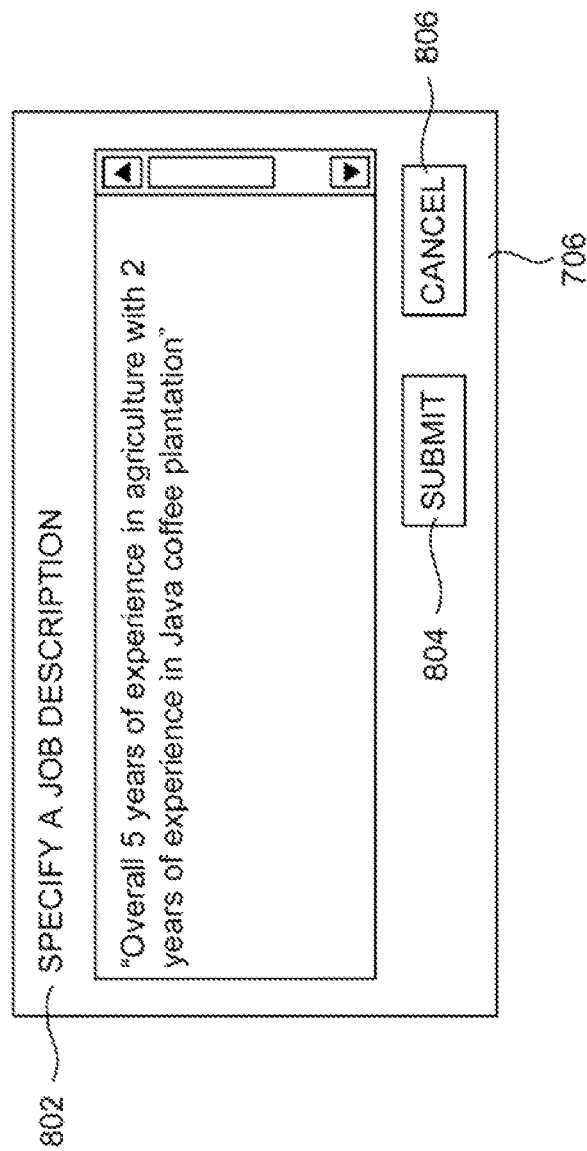
FIG. 8 illustrates a user interlace view of the advance search button of FIG. 7 according to an embodiment herein.

FIG. 8 illustrates a user interface view of the advance search button 706 of FIG. 7 according to an embodiment herein. The user interface view of the advance search button 706 includes a specify a job description field 802, a submit button 804, and a cancel button 806. The specify a job description field 802 allows the user 102 to specify one or more job descriptions. For example, the specified job description may be "Overall 5 years of experience in agriculture with 2 years of experience in Java coffee plantation"

The user 102 may submit the job description by clicking on the submit button 804. Once she job description is submitted, one or more keywords associated with the job description is obtained using the keyword extraction module 314. Similarly, the job description is annotated to obtain useful information. For example, the content of the job description is collected using the content collection module 304, the annotations give the following details Overall experience in Agriculture; 5 years Experience for keyword Java, coffee and plantation; 2 years For example, the keyword extraction module 314 extracts the one or more keywords (e.g. 5 keywords) for the given job description. The extracted keywords are:

Java, Coffee, Plantation, Agriculture

Once these keywords are identified and extracted, the keywords are disambiguated to determine the right meaning. To disambiguate, the resume identifying tool 106 determines the different disambiguated terms for the extracted keywords and their related categories. Further, the resume identifying tool 106 uses the knowledge base 218 stored in the external database 216 for obtaining categories for the extracted keywords. Each keyword is queried separately against the knowledge base 218 and corresponding categories are obtained. For example, for the above keywords, the categories obtained are 1. Java
   1.1 Java Language—{Computers, Computing, Computing Platforms, Java Platform}
   1.2 Java Coffee—{Business, Industry, Food Industry, Food Science, Food and Drink, Beverages, Hot Beverages, Coffee, Coffee Varieties}
2. Coffee—{Business, Industry, Food Industry, Food Science, Feed and Drink, Beverages, Hot Beverages}
3. Plantation—{Agriculture, Agricultural Establishments}
4. Agriculture—{Agriculture}

In the above example, Java coffee and Java language are the two keywords obtained from the knowledge base 218 for the keyword "Java". Thus, the keyword "java" needs to be disambiguated for two words (java as a language and java as a coffee). In order to disambiguate the keyword "java" and to compute the context in the right meaning, the resume identifying tool 106 uses the search query disambiguating module 316b. The search query disambiguating module 316b constructs a lattice based on a weighted Formal Concept Analysis (wFCA) using the keywords as objects and their corresponding categories as attributes.

Figure 9:
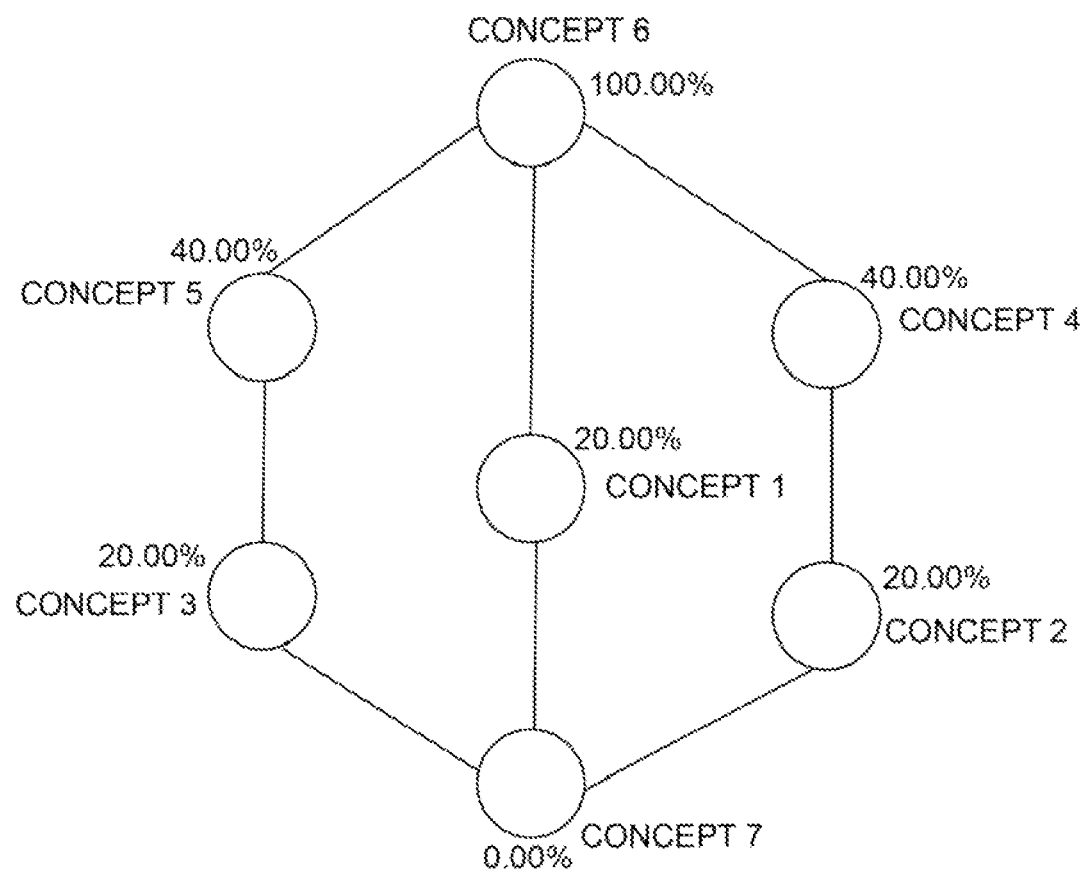
FIG. 9 illustrates a graphical representation of a lattice construction for the job description of FIG. 8 using the search query disambiguating module of FIG. 3 of the resume identifying tool of FIG. 1 according to an embodiment herein.

FIG. 9 illustrates a graphical representation 900 of a lattice construction for the job description of FIG. 8 using the search query disambiguating module 316b of FIG. 3 of the resume identifying tool 106 of FIG. 1 according to an embodiment herein. The search query disambiguating module 316b forms various concepts with the extracted keywords and their associated, categories. For example, the concept—1 to concept—7 associated with FIG. 9 are Concept—1: [Java Language]: [Computing Platforms, Computers, Java Platform, Computing]

Concept—2: [Java Coffee]: [Coffee, Beverages, Hot Beverages, Business, Coffee Varieties, Food Industry, Food and Drink, Food Science, Industry]

Concept—3: [Plantation]: [Agriculture, Agricultural Establishments]

Concept—4: [Coffee, Java Coffee]: [Beverages, Hot Beverages, Business, Food Industry, Food and Drink, Food Science, Industry]

Concept—5: [(Agriculture, Plantation]: [Agriculture]

Concept—6: [Coffee, Agriculture, Plantation, Java Language, Java Coffee]: [ ]

Concept—7: [ ]: [Agriculture, Coffee, Beverages, Business, Computers, Coffee Varieties, Java Platform, Food Science, Agricultural Establishments, Computing Platforms, Hot Beverages, Food Industry, Computing, Food and Drink, Industry]

In one embodiment, the search query disambiguating module 316b interprets that the concept 1 "Java Language" has no association with any other concept or keyword, whereas, the concept 2 "Java Coffee" forms a concept with Coffee. Hence, the correct disambiguation is "Java Coffee". The search query disambiguating module 316b computes the weight (shown in the percentage) for each node using the weighted FCA. A simple heuristic model of weighted FCA computes the weight of the nodes and the node with highest weight is used to disambiguate the keyword in the context of right meaning. For computing weight, the heuristic assigns equal probability for all the five keywords. Hence, them are totally 5 keywords having a weight of ⅕ each. The concept 1 to concept 7 defines a distinct category set for each keyword. Therefore, the weight for each keyword of concept 1 to concept 5 is ⅕ (20.00%). In one embodiment, categories are arranged based on a hierarchy.

In addition, the categories of "java coffee" are associated with the categories of "coffee" and both of them form the concept 4. Thus, the keywords "java coffee" and "coffee" are strongly associated in the context of given job description. The weight for the concept 4 will be 2*(⅕) (i.e., ⅖ is equal to 40.00%), Thus, the keyword "java" is treated as "java" and not as "java language" by using weighted FCA. Similarly, each keyword of a resume of the set of resumes stored in the database 302 is disambiguated to identify a context in which the keyword used using wFCA.

Once disambiguation of one or more keywords associated with the search query occurs, the resume identifying tool 106 identifies one or more resumes that correspond to the search query from the database 302. For example, the resume identification module 318 matches a keyword (e.g., Java coffee) of the search query, and their associated one or more categories with (i) one or more disambiguated keywords that correspond to each resume stored in the database 302, and (ii) and categories associated with each disambiguated keyword. For example, the database 302 includes a disambiguated keyword (e.g., Java coffee plantation) that corresponds to a first resume, and then the resume identification module 318 identifies the first resume as relevant. In another example, when a search query includes a keyword (e.g. Agriculture), the resume identification module 318 identifies a second resume which includes a keyword "plantation" even though it does not mention the keyword "Agriculture" explicitly. The resume identification module 318 considers the second resume as a relevant resume for the search query, by querying the disambiguated keyword (e.g., plantation) for associated categories from the knowledge base 218. The associated categories include various keywords that indicate "Agriculture" is related to "plantation". Thus, the resume identification module 318 identifies the second resume as relevant. When there is no correspondence between a keyword of the search query, and at least one disambiguated keyword of a resume, then the resume is considered as irrelevant. Also, when there is no ambiguity found in the search query, and in a resume, the identification of the one or more resumes occurs by matching keywords of the search query with one or more keywords of each resume. In one embodiment, each keyword of a resume undergoes disambiguation process. For example, for the search query (e.g., Agriculture), the resume identifying tool 106 identifies no ambiguity in the keyword, "agriculture", and the keyword "Agriculture" is matched as if is with one or more keywords in a resume 504. Also, resumes that are related to "Java language" are considered, to be irrelevant based on disambiguation found, and stored in the database 302.

In one embodiment, the search query is a set of keywords (not job description). Examples of such search query include a) "Good in Java and C++ with 5 years of experience", and b) "Strong business acumen and good in Marketing, Market Research, Raising Awareness, Brand Management and Market Penetration, Good to know PERT, SAP CRM, Google Analytics and Google Adwords. Good to have competitor analysis skills and capable of conducting feasibility studies. Knowledge of FMCG will be preferred"

Using the details from the job description, the user 102 can find one or more right candidates by matching details of the candidates extracted from the resumes.

Figure 10:
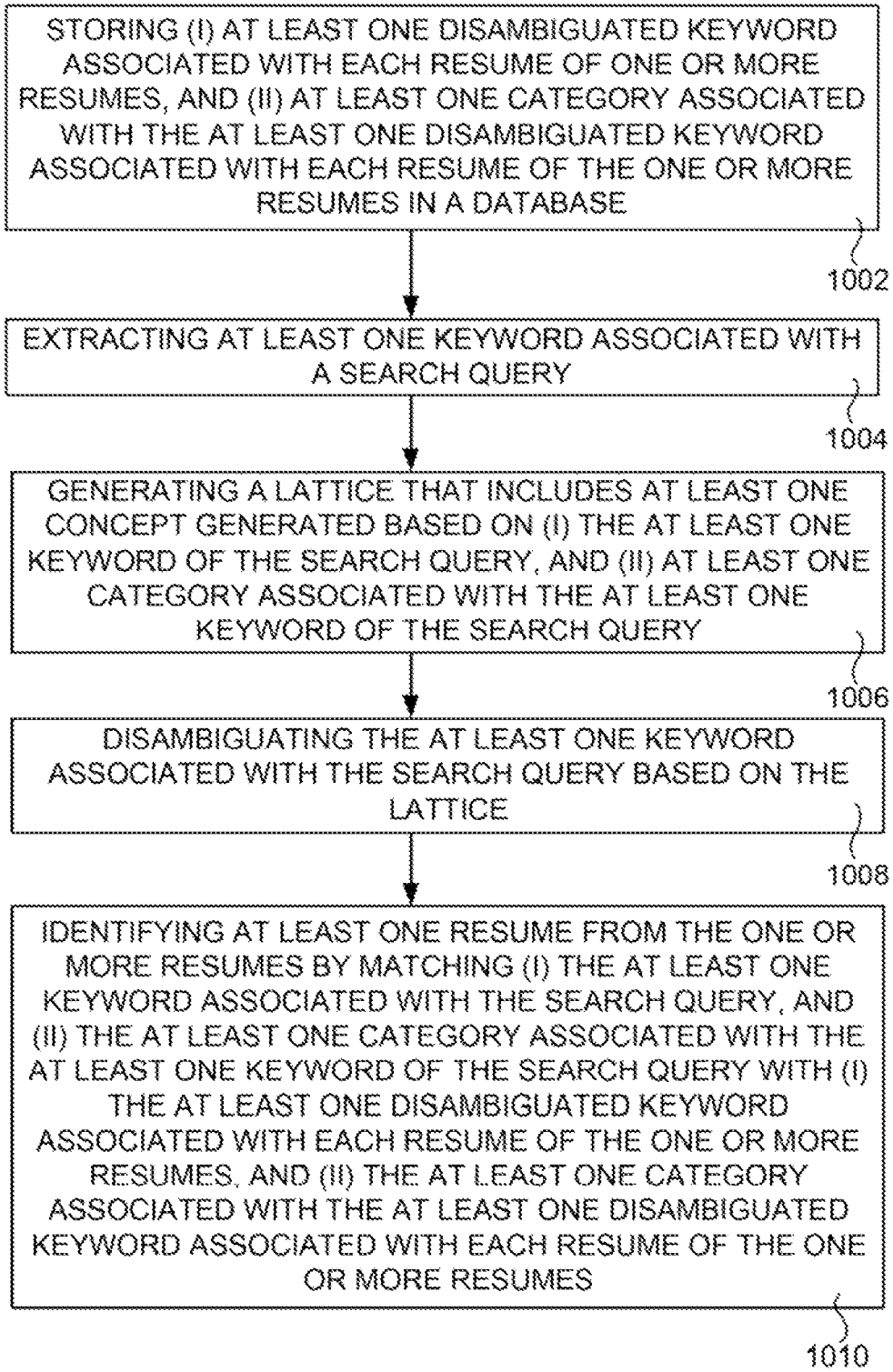
FIG. 10 illustrates a flow diagram that includes a method of identifying one or more resumes for a search query based on weighted formal concept analysis using the resume identifying tool of FIG. 1 according to an embodiment herein.

FIG. 10 illustrates a flow diagram that includes a method of identifying one or more resumes for a search query based on weighted formal concept analysis using the resume identifying tool of FIG. 1 according to an embodiment herein. In step 1002, storing (i) at least one disambiguated keyword associated with each resume of a set of resumes, and (ii) at least one category associated with the at least one disambiguated keyword associated with each resume of the set of resumes in tire database 302. In step 1004, extracting at least one keyword associated with the search query occurs. In step 1006, generating a lattice that includes at least one concept generated based on (i) the at least one keyword of the search query, and (ii) at least one category associated with the at least one keyword of the search query. In step 1008, disambiguating the at least one keyword associated with the search query based on the lattice occurs. In step 1010, identifying the one or more resumes from the set of resumes by matching (i) the at least one keyword associated with the search query, and (ii) the at least one category associated with the at least cue keyword of the search query with (i) the at least one disambiguated keyword associated with each resume of the set of resumes, and (ii) the at least one category associated with the at least one disambiguated keyword associated with each resume of the set of resumes. The at least one concept associated with the search query is generated with the at least one keyword as object, and the at least one category associated with the at least one keyword as attribute.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from hulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
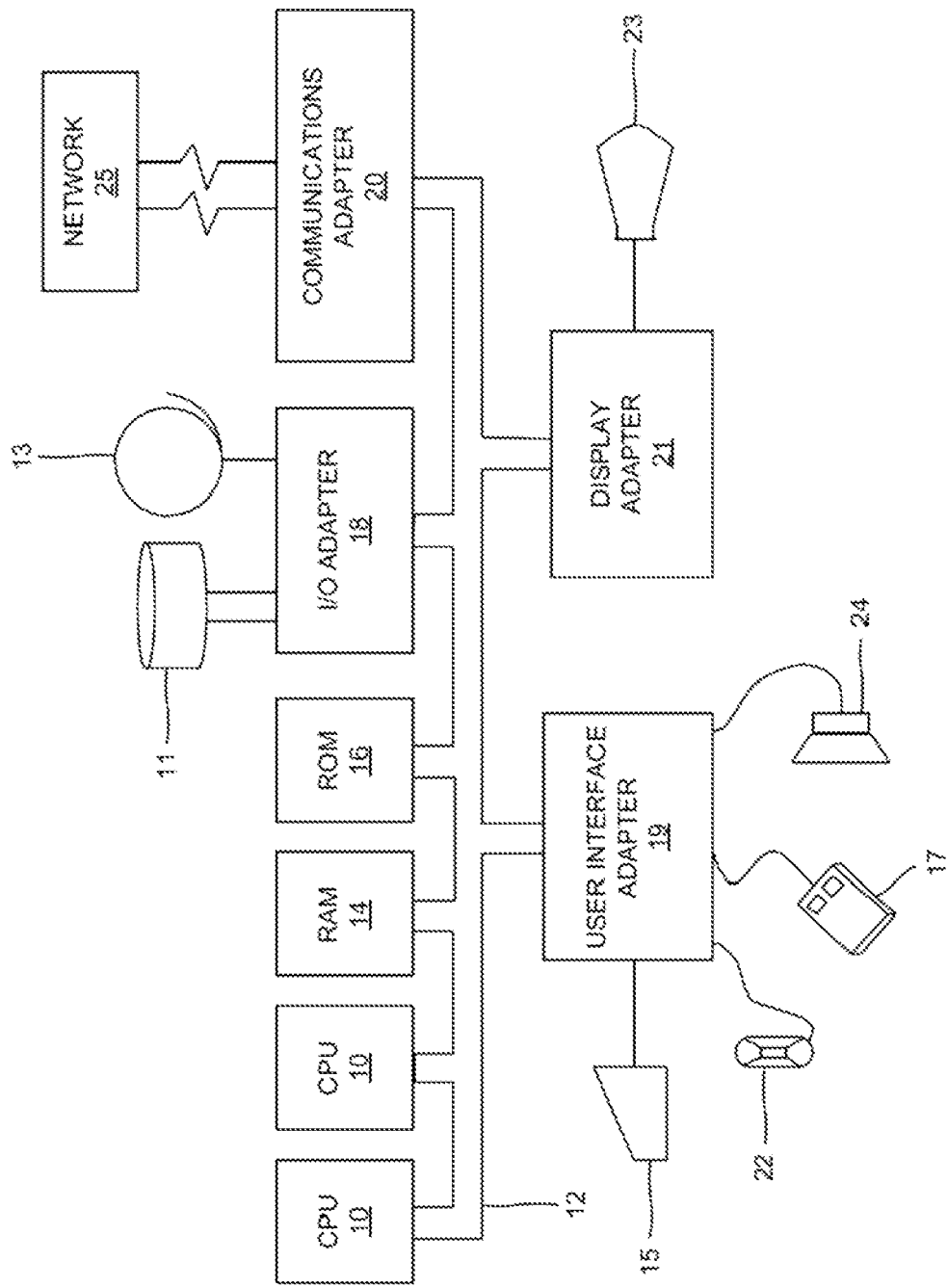
FIG. 11 illustrates a schematic diagram of a computer architecture used in accordance with the embodiments herein.

A representative hardware environment for practicing the embodiments herein is depicted in FIG. 11. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch, screen device (not shown) to the bus 12 to gather user input. Additionally, a communication, adapter 20 connects the bus 12 to a data processing network 25, and a display adapter 21 connects the bus 12 to a display device 23 which may be embodied as an output device such as a monitor, printer, or transmitter, for example.

The resume identifying tool 106 identifies and retrieves one or more resumes based on project details, and experiences mentioned in the one or more resumes. In one embodiment, the experiences may be related to an overall experience of a resume or one or more individual keywords extracted from the resume. In addition to matching of one or more keywords of a search query to one or more keywords of a resume, matching of experience associated with the one or mom keywords also occur. Also, the resume identifying tool 106 automatically analyzes a search query (e.g., job description), and identifies one or more relevant resumes that correspond to the search query, whereas a typical resume identifying tool allows the user 102 to search a database of candidates with keywords based on their manual understanding of the job description. The resume identifying tool 106 provides more precise results as it is based on wFCA.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein, can be practiced with modification within the spirit and scope of the appended claims.

The invention claimed is:

1. A system for identifying at least one resume from a plurality of resumes based on a search query using a resume identifying tool, said system comprising:
   a memory unit that stores a database and a set of modules, wherein said database stores (i) at least one disambiguated keyword associated with each resume of said plurality of resumes, and (ii) at least one category associated with said at least one disambiguated keyword associated with each resume of said, plurality of resumes;
   a display unit; and
   a processor that executes said set of modules, wherein said set of modules comprising:
   (a) a keyword extraction module, executed by said processor, that extracts at least one keyword associated with said search query;
   (b) a disambiguating module, executed by said processor, that is configured to disambiguate said at least one keyword associated with said search query based on a weighted Formal Concept Analysis (wFCA), wherein said disambiguating module generates a lattice that comprises at least one concept generated based on (i) said at least one keyword of said search query, and (ii) at least one category associated with said at least one keyword of said search query; and
   (c) a resume identification module, executed by said processor, that is configured to identify said at least one resume from said plurality of resumes by matching (i) said at least one keyword associated with said search query, and (ii) said at least one category associated with said at least one keyword of said search query with (i) said at least one disambiguated keyword associated with each resume of said plurality of resumes, and (ii) said at least one category associated with said at least one disambiguated keyword associated with each resume of said plurality of resumes.

2. The system of claim 1, wherein said at least one concept associated with said search query is generated with said at least one keyword as object, and at least one category associated with said at least one keyword as attribute.

3. The system of claim 2, wherein said at least one category is obtained from a knowledge base.

4. The system of claim 2, wherein said at least one category is arranged based on a hierarchy.

5. A non-transitory program storage device readable by computer, and comprising a program of instructions executable by said computer to perform a method of identifying at least one resume from a plurality of resumes based on a job description using a weighted Formal Concept Analysis (wFCA), said method comprising:
   (a) storing (i) at least one disambiguated keyword associated with each resume of said plurality of resumes, and (ii) at least one category associated with said at least one disambiguated keyword associated with each resume of said plurality of resumes in a database;
   (b) extracting at least one keyword associated with said job description;
   (c) disambiguating said at least one keyword associated with said job description using a disambiguating module based on said weighted Formal Concept Analysis (wFCA), wherein said disambiguating module generates a lattice that comprises at least one concept generated based on (i) said at least one keyword of said job description, and (ii) at least one category associated with said at least one keyword of said job description; and
   (d) identifying said at least one resume front said plurality of resumes by matching (i) said at least one keyword associated with said job description, and (ii) said at least one category associated with said at least one keyword of said job description with (i) said at least one disambiguated keyword associated with each resume of said plurality of resumes, and (ii) said at least one category associated with said at least one disambiguated keyword associated with each resume of said plurality of resumes.

6. The non-transitory program storage device of claim 5, wherein said at least one concept associated with said job description is generated with said at least one keyword as object, and at least one category associated with said at least one keyword as attribute.

7. The non-transitory program storage device of claim 6, wherein said at least one category is obtained from a knowledge base.

8. The non-transitory program storage device of claim 6, wherein said at least one category is arranged based on a hierarchy.

9. A method of identifying at least one resume from a plurality of resumes based on a search query using a weighted Formal Concept Analysis (wFCA), wherein said method comprising:
   (a) storing (i) at least one disambiguated keyword associated with each resume of said plurality of resumes, and (ii) at least one category associated with said at least one disambiguated keyword associated with each resume of said plurality of resumes in a database;
   (b) extracting at least one keyword associated with said search query;
   (c) generating a lattice that comprises at least one concept generated based on (i) said at least one keyword of said search query, and (ii) at least one category associated with said at least cue keyword of said search query;
   (d) disambiguating said at least one keyword associated with said search query based on said lattice; and
   (e) identifying said at least one resume from said plurality of resumes by matching (i) said at least one keyword associated with said search query, and (ii) said at least one category associated with said at least one keyword of said search query with (i) said at least one disambiguated keyword associated with each resume of said plurality of resumes, and (ii) said at least one category associated with said at least one disambiguated keyword associated with each resume of said plurality of resumes, wherein said at least one concept associated with said search query is generated with said at least one keyword as object, and said at least one category associated with said at least one keyword as attribute.

10. The method of claim 9, wherein said at least one category is arranged based on a hierarchy.

11. The method of claim 9, wherein said at least one category is obtained from a knowledge base.

12. The method of claim 9, wherein said search query comprises a job description.

* * * * *